United States Patent
Ahluwalia

(10) Patent No.: US 11,388,188 B2
(45) Date of Patent: Jul. 12, 2022

(54) SYSTEMS AND METHODS FOR AUTOMATED INTRUSION DETECTION

(71) Applicant: The Boeing Company, Chicago, IL (US)

(72) Inventor: Rajpreet Singh Ahluwalia, Kent, WA (US)

(73) Assignee: The Boeing Company, Chicago, IL (US)

( * ) Notice: Subject to any disclaimer, the term of this patent is extended or adjusted under 35 U.S.C. 154(b) by 263 days.

(21) Appl. No.: 16/409,735

(22) Filed: May 10, 2019

(65) Prior Publication Data

US 2020/0358817 A1 Nov. 12, 2020

(51) Int. Cl.
*H04L 29/06* (2006.01)
*H04L 9/40* (2022.01)
*H04L 61/5046* (2022.01)

(52) U.S. Cl.
CPC ...... *H04L 63/1466* (2013.01); *H04L 61/2046* (2013.01); *H04L 63/0236* (2013.01); *H04L 63/105* (2013.01); *H04L 63/1425* (2013.01)

(58) Field of Classification Search
CPC ............. H04L 63/1466; H04L 63/0236; H04L 63/105; H04L 63/1425; H04L 61/2046
See application file for complete search history.

(56) References Cited

U.S. PATENT DOCUMENTS

| | | | |
|---|---|---|---|
| 6,478,581 B1 | 11/2002 | Lin | |
| 8,503,330 B1* | 8/2013 | Choong | H04W 24/02 370/254 |
| 8,621,065 B1* | 12/2013 | Saurel | G06F 21/554 709/224 |
| 9,071,576 B1* | 6/2015 | Earl | H04L 63/1466 |
| 2002/0032774 A1* | 3/2002 | Kohler, Jr. | H04L 63/1458 709/225 |

(Continued)

OTHER PUBLICATIONS

"Extended European Search Report Received For Application No. 20172911.8-1218", dated Sep. 28, 2020, 8 Pages.

(Continued)

*Primary Examiner* — Vance M Little

(57) ABSTRACT

Implementations provide automated intrusion alert-based blacklisting with minimal false positives that ignores regular business operations, scalable to accommodate the volume of IDS alerts received by high-traffic internet-accessible networked systems. Implementations identify and block hostile infrastructure IP addresses during the reconnaissance phase based on IDS alert(s). Each IDS alert is automatically reviewed in historical context and triggers IP blocking as necessary. Some implementations maintain TCP/IP handshake records, preventing blocking an IP used to conduct regular business operations on the network that a malicious party has spoofed to avoid identification. Based on the historical context of each IP address within the local network environment, specifically regular business operations traffic versus malicious traffic, the IP address is blocked only if the majority of connections therefrom are malicious. This approach provides substantial cost-savings; frees up resources and personnel otherwise necessary for manual processes; and increases overall network security through automated network defense.

20 Claims, 8 Drawing Sheets

(56) References Cited

U.S. PATENT DOCUMENTS

| | | | |
|---|---|---|---|
| 2005/0044406 A1* | 2/2005 | Stute | C12Q 2525/143 726/4 |
| 2005/0273857 A1* | 12/2005 | Freund | H04L 63/1416 726/23 |
| 2006/0031938 A1* | 2/2006 | Choi | G06F 21/552 726/25 |
| 2006/0143710 A1* | 6/2006 | Desai | H04L 63/123 726/23 |
| 2010/0218254 A1* | 8/2010 | Gray, II | H04L 63/1408 726/23 |
| 2011/0158100 A1* | 6/2011 | Ye | H04L 47/12 370/235 |
| 2016/0021056 A1* | 1/2016 | Chesla | H04L 63/14 726/11 |
| 2016/0164896 A1* | 6/2016 | Baldonado | H04L 63/1425 726/23 |
| 2019/0020666 A1* | 1/2019 | Leung | H04L 63/1416 |
| 2019/0042738 A1* | 2/2019 | Juliato | G06F 21/554 |
| 2019/0182266 A1* | 6/2019 | Doron | H04L 63/1425 |
| 2020/0014711 A1* | 1/2020 | Rego | H04L 43/062 |
| 2020/0145455 A1* | 5/2020 | Nandi | H04L 63/1466 |

OTHER PUBLICATIONS

Costa, Manuel, et al., "Vigilante: End-to-End Containment of Internet Worm Epidemics", pp. 1-68, vol. 26, No. 9, Dec. 2008.

* cited by examiner

| DATABASE RECORD OF HISTORICAL CONTEXTUAL INFORMATION 200 FOR EACH IP ADDRESS 220 | | |
|---|---|---|
| TYPE OF CONTEXT INFORMATION | DESCRIPTION | SAMPLE VALUE |
| FIRST SEEN DATE 212 | The earliest date the device received a connection request from the IP address | 2018 January 1 13:50:34 |
| LAST SEEN DATE 214 | The last date the device received a connection request from the IP address | 2018 January 1 14:00:34 |
| INTERNAL HITS COUNT 216 | The number of connection requests received by the device from the IP address | 5,000 |
| PRIOR TCP/IP CONNECTION ESTABLISHMENT INDICATOR 218 | Boolean value. True if the device has previously established a TCP/IP connection with the IP address, otherwise false. | FALSE |
| APPLICATION LAYER DATA INFORMATION 220 | Logged transaction data comprising information on specific recognized types of applications or communications protocols historically associated with the IP address. | Request to open connection on port associated with an unauthorized remote access protocol. |

FIG. 2

| DATABASE RECORD OF HISTORICAL CONTEXTUAL INFORMATION 300 FOR EACH IP ADDRESS 320 | | |
|---|---|---|
| TYPE OF CONTEXT INFORMATION | DESCRIPTION | SAMPLE VALUE |
| FIRST SEEN DATE 312 | The earliest date the device received a connection request from the IP address | 2018 January 1 13:50:34 |
| LAST SEEN DATE 314 | The last date the device received a connection request from the IP address | 2018 March 1 13:50:34 |
| INTERNAL HITS COUNT 316 | The number of connection requests received by the device from the IP address | 50 |
| PRIOR TCP/IP CONNECTION ESTABLISHMENT INDICATOR 318 | Boolean value. True if the device has previously established a TCP/IP connection with the IP address, otherwise false. | TRUE |
| APPLICATION LAYER DATA INFORMATION 320 | Logged transaction data comprising information on specific recognized types of applications or communications protocols historically associated with the IP address. | Request to open connection on port associated with trusted Virtual Private Networking (VPN) solution. |

FIG. 3

SYSTEMS AND METHODS FOR AUTOMATED INTRUSION DETECTION

BACKGROUND

Hostile network intrusions (also known as cyber-attacks) commonly begin with a malicious party scanning an internet-accessible networked system for vulnerabilities using hostile infrastructure (e.g., one or more computing devices under the control of the malicious party). This reconnaissance phase of a cyber-attack typically triggers intrusion detection system (IDS) alerts. The reconnaissance phase is typically followed by some sort of attack phase (e.g., sending a malicious email, performing command and control operations, or other hostile network traffic) also originating from the same hostile infrastructure.

Existing only prevent specific scans or hostile traffic based on a specific pattern (e.g., character sequences indicative of a probable cyber-attack of a specific, known type) presented in an IDS alert. This means of prevention fails to identify the infrastructure as hostile. Thus, subsequent traffic from the hostile infrastructure cannot be systemically blocked, such as by an intrusion prevention system (IPS) based on origination point. Instead, human operators must manually review selective IDS hits, perform lookups for historical context and then trigger blocking and monitoring actions. It is often difficult or impossible for the manual lookup to scale due to the overwhelming number of IDS alerts received per unit time, especially in high-traffic environments. Operators working in such environments lack the resources and ability to maintain longer term history necessary for automating such context-based decisions.

Thus, convention systems are typically limited to suppressing (e.g., temporarily blocking during a large number of cyber-attacks from) an attacker. However, blocking all traffic from an Internet Protocol (IP) address based only on a single signature match carries great risk, as IP addresses are vulnerable to spoofing. An attacker using a spoofed IP address is able to cause a network disruption by launching an attack that appears to be from an IP address normally used to conduct regular business operations on the network.

SUMMARY

Some implementations provide a device for automated intrusion alert-based blacklisting. The device includes a communication interface configured to receive a network threat report indicating a detected threat to a network, and a processor. The processor is configured to: determine an Internet Protocol (IP) address related to the detected threat to the network; access a database of contextual information to determine historical contextual information for the IP address relating to communication with the network; compare the historical contextual information to one or more blocking thresholds; and output the IP address to an indicator management system if the historical contextual information for the IP address exceeds the one or more blocking thresholds. The indicator management system maintains a blocklist for a perimeter system of the network and adds the IP address to the blocklist.

Other implementations provide a method for automated intrusion alert-based blacklisting. The method includes receiving, using a communication interface, a network threat report indicating a detected threat to a network; determining, using a processor, an IP address related to the detected threat to the network; accessing a database of contextual information to determine historical contextual information for the IP address relating to communication with the network; comparing the historical contextual information to one or more blocking thresholds; and outputting the IP address (154) to an indicator management system if the historical contextual information for the IP address exceeds the one or more blocking thresholds. The indicator management system maintains a blocklist for a perimeter system of the network and adds the IP address to the blocklist.

Still other implementations provide one or more non-transitory computer readable media having computer-executable instructions stored thereon for automated intrusion alert-based blacklisting, which, on execution by a computer, cause the computer to perform operations. The operations include receiving, using a communication interface, a network threat report indicating a detected threat to a network; determining, using a processor, an IP address related to the detected threat to the network; accessing a database of contextual information to determine historical contextual information for the IP address relating to communication with the network; comparing the historical contextual information to one or more blocking thresholds; and outputting the IP address to an indicator management system if the historical contextual information for the IP address exceeds the one or more blocking thresholds. The indicator management system maintains a blocklist for a perimeter system of the network and adds the IP address to the blocklist.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the present disclosure will become better understood when the following detailed description is read with reference to the accompanying drawings, wherein:

FIG. 2 is a tabular diagram illustrating a sample database record of historical contextual information for an Internet Protocol (IP) address associated with hostile infrastructure in accordance with an implementation.

FIG. 3 is a tabular diagram illustrating a sample database record of historical contextual information for an IP address associated with regular business infrastructure in accordance with an implementation.

Corresponding reference characters indicate corresponding parts throughout the drawings.

DETAILED DESCRIPTION

Figure 1:
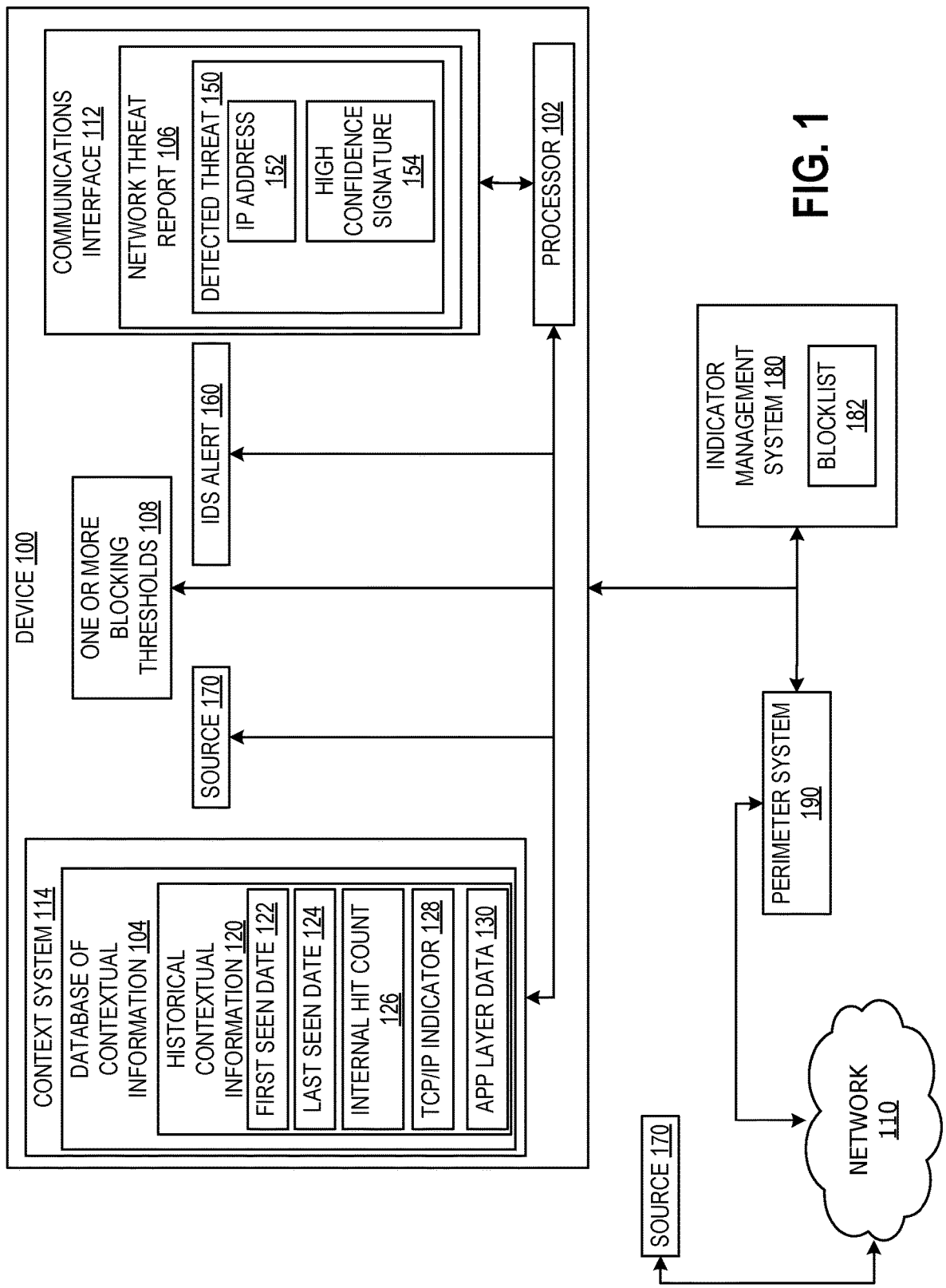
FIG. 1 is a block diagram illustrating an implementation of a device for automated intrusion alert-based blacklisting in accordance with an implementation.

Referring to the figures, implementations of the disclosure include systems and methods for automated intrusion alert-based blacklisting that protect an internet-accessible networked system from malicious activity, such as reconnaissance stage scans and subsequent attack phase(s). The systems and methods automatically identify hostile infrastructure under the control of a malicious party when such hostile infrastructure attempts to scan for vulnerabilities or otherwise interact with the internet-accessible networked system. This attempted reconnaissance generates intrusion detection system (IDS) alert(s) containing information about the originating hostile infrastructure in some implementations.

The disclosure uses the IDS alert(s) to identify hostile infrastructure and all subsequent traffic from the hostile infrastructure based on the hostile traffic's origination point (e.g., by Internet Protocol (IP) address). Various implementations automate the review of every IDS alert, perform lookups for historical context, and then trigger any necessary blocking and monitoring actions. This automated review is scalable to accommodate otherwise massive numbers of IDS alerts received per unit time on a high-traffic internet-accessible networked system. Given the higher efficiency of such automation, contemporary operators working in environments implementing the disclosure have sufficient resources and ability to maintain the longer term historical contextual information necessary to automate such context-based decisions, thereby also improving the user experience.

The disclosure is not limited to automatically suppressing an attacker. Blocking all traffic from an IP address based only on a single signature match carries great risk of blocking an IP used to conduct regular business operations on the network that a malicious party has spoofed to avoid identification. Further, blocking a spoofed IP address in effect causes a denial of service attack against the actual devices or services located at the blocked IP address, which are now unable to interact with the internet-accessible networked system. A malicious party intending to deliberately block access to a critical piece of infrastructure outside the internet-accessible networked system (e.g., public websites, domain name servers, etc.) is able to do so easily in such a scenario. Even where spoofing is not a concern, indiscriminately blocking all traffic from an IP address based only on a single signature match also risks placing undue strain on the resources of the internet-accessible networked system (e.g., by causing overuse of storage, memory, processing power, etc.).

Therefore, in some implementations, the disclosure thus maintains, for each encountered IP address, a record of whether a valid transmission control protocol (TCP)/IP connection (which requires a valid identifying TCP three-way handshake) has been established in the past. If such a valid connection has been previously established, the IP address is indicated to be valid and not spoofed. In these implementations, the requirement of a valid TCP/IP connection eliminates the risk of spoofing associated with the use of a User Datagram Protocol (UDP) connection, which does not provide any handshake mechanism. In some such implementations, the historical context data comprises in part, but not in the entirety, the record of whether a valid TCP/IP connection has been established in the past.

Systems and methods for fully-scalable automated intrusion alert-based blacklisting are disclosed that automatically block hostile infrastructure such that regular business operations are not impacted. Compared to existing contemporary IPSs and or non-scalable manual blacklisting techniques, the disclosed automated systems and methods provide substantial cost-savings; free up resources and personnel that would otherwise be necessary for manual processes; and increase overall network protections by allowing for automated network defense through blacklisting of a massively greater number of known reconnaissance and attack attempts as represented by IDS alerts or detected threats.

The elements described herein in various implementations operate in an unconventional manner to provide automated intrusion alert-based blacklisting by recognizing that an IP address used by a malicious party in a reconnaissance stage scan is significantly likely to be re-used for attack by other vectors (e.g., email, database access, security hole exploits, etc.) by the same malicious party. In some implementations, IDS alerts provide the disclosure with high fidelity signatures to trigger blacklisting, ensuring no, low, or very low probability of a false positive identification resulting in automated blacklisting of regular business operations traffic. In this manner, when a processor is programmed to perform the operations described herein, the processor is used in an unconventional way, and allows for the more reliable identification and alerting of malicious network activity.

As an additional layer of protection against unintentionally interrupted regular business operations traffic, some implementations of the disclosure, having identified potentially hostile infrastructure by IP address, perform a lookup against a context system to determine the historical context associated with the IP address within the local network environment. If there is an overwhelming amount of regular business operations traffic versus malicious traffic associated with the IP address within the internal network environment, the disclosure does not act to blacklist the IP address. However, if the majority of connections from a specific IP address are malicious, the disclosure blacklists the IP address of the hostile infrastructure while the hostile infrastructure is still in the reconnaissance stage, preventing later, potentially damaging phases of the attack.

The disclosure is thus more effective than non-automated alternatives and more economical to implement. The disclosure provides network protection in the form of fully-scalable automated intrusion alert-based blacklisting while also causing the least possible disruption to regular business operations traffic.

Referring to FIG. 1, a block diagram illustrates an implementation of a device 100 for automated intrusion alert-based blacklisting. In some implementations, the device 100 is a computer, a server, a distributed system, a web server, a database, a mobile device, a communication device, a desktop computer, a laptop, a tablet computer, or a combination thereof. The device 100 comprises a communication interface 112, configured to receive a network threat report 106 indicating a detected threat 150 to a network 110, and a processor 102. The network 102 includes a wired network, a wireless network, or both. The communication interface 112 is any component configured to enable bidirectional communications between the device 100 and any other component accessible via the network 110.

In some implementations, the processor 102 is further configured to use an intrusion detection system (IDS) alert 160 relating to the detected threat 150 as a trigger. The IDS alert 160 is a piece of data communicable across the network 110 to the device 100 that is configured to match (and thus identify) a unique attack condition. Unique attack conditions include specific tools used by hostile infrastructure to penetrate or compromise a target (e.g., specific known trojans, viruses, worms, harmful HTTP POST requests, or other malicious code). In such implementations, the detected threat 150 comprises a high confidence signature 154 as a threat. The high confidence signature 154 is thus directly linkable to a specific, identifiable type of attack, allowing the device 100 to react in the most suitable manner. In some such implementations, the high confidence signature 154 identifies the threat with at least one of no, low, or very low probability of a false positive identification. In other implementations, the device 100 uses available high confidence signatures 154 as a basis for heuristic- or pattern matching-based analysis of potential threats for which an exact signature is not available.

In other such implementations, the high confidence signature 154 is retrieved from an at least one source 170. The source 170 is any repository accessible by the device 100 that contains at least one high confidence signature 154 usable by the device 100 as described herein. In some implementations featuring the source 170, the source 170 is located on at least one of the device 100 or the network 110. Sources include but are not limited to particular websites, a particular organization, or a combination thereof. In some such implementations, the source 170 is distributed across multiple storage devices on the network 110, either including or not including the device 100. In other implementations featuring the source 170, the source 170 is a trusted third party. As an illustration, in some industries competitors pool network security resources to create trusted third party sources 170 that combine all high confidence signatures known to the competitors, and then share the source to promote heightened and ever-improving network security across the entire infrastructure shared by the competitors (e.g., the global internet).

The processor 102 is configured to determine an IP address 152 related to the detected threat 150 to the network 110 and access a database of contextual information 104 to determine historical contextual information 120 for the IP address 152 relating to communication with the network 110. The historical contextual information 120 is described in greater detail in, inter alia, the discussion of FIGS. 2 and 3 herein.

In some implementations, the historical contextual information 120 is stored in the database of contextual information 104 within a context system 114. The context system 114 uses the database of contextual information 104 to configure, adjust, and maintain the blocking thresholds 108. In some such implementations, the database of contextual information 104 is a summary database containing historical information 124 for all the IP addresses 152 detected on the network 110. In other such implementations, the historical contextual information 120 comprises a first seen date 122, a last seen date 124, and an internal hits count 126 for each of the IP addresses 152. However, other contextual or historical data can be maintained in some implementations. In yet other such implementations, the historical contextual information 120 comprises application layer data 130. The application layer data 130 comprises, but is not limited to, logged transaction data comprising information on specific recognized types of applications or communications protocols historically associated with the IP address 152. The sourcing of the logged transaction data is described elsewhere herein. Thus, in implementations including the application layer data 130, the application data 130 includes at least one of but is not limited to logged transaction data regarding email history, proxy connection history, web-server connection history, or any other logged transaction data associable with the IP address 152. In some implementations including the application layer data 130, the application layer data 130 is used to differentiate regular business operations traffic from hostile infrastructure traffic. Regular business operations traffic generates recognizable and allowable application layer data 130, while hostile infrastructure traffic does not.

The first seen date 122 is the earliest date the device 100 received a connection request from the IP address 152. The last seen date 124 is the last date the device received a connection request from the IP address 152. In some implementations, both the first seen date 122 and the last seen date 124 are stored as timestamps including at least one of the calendar date and time as measured in hours, minutes and seconds. In some implementations, the first seen date 122 and the last seen date 124 are stored in compliance with ISO 8601. The internal hits count 126 is the number of connection requests received by the device 100 from the IP address 152 beginning at the first seen date 122 and ending at the last seen date 124.

In yet other such implementations, the historical contextual information 120 comprises a prior TCP/IP connection establishment indicator 128 for each of the IP addresses 152. In implementations including the prior TCP/IP connection establishment indicator 128 for each of the IP addresses 152, the prior TCP/IP connection establishment indicator 128 indicates whether the device 100 has previously established a TCP/IP connection with each IP address 152. If the device 100 has previously established a TCP/IP connection with each of the IP addresses 152, each of the IP addresses 152 is valid and not being spoofed.

The processor 102 is further configured to compare the historical contextual information 120 to one or more blocking thresholds 108. In some implementations, the one or more blocking thresholds 108 are numerical values indicating whether the IP address 152 associated with one of the one or more blocking thresholds 108 based on the number of regular business connection requests originated from the IP address 152 or the number of hostile connection requests originated from the IP address 152. In some such implementations prioritizing allowing the highest possible number of regular business connection requests, if any history of regular business connection requests originating from the IP address 152 exists within the historical context information 120, the one or more blocking thresholds 108 are configured to allow all traffic through from such IP address 152. In other implementations configured to be as cautious as possible with regard to unknown IP addresses 152, the one or more blocking thresholds 108 are configured to block all connection requests originating from any IP addresses 152 not already within the historical context information 120. Depending on the needs and requirements of a particular application of the disclosure, the blocking thresholds 108 are configurable to allow varying quantities of connection requests originating from IP addresses 152 either associated or not associated with regular business operations. In any implementation, once the one or more blocking thresholds 108 are exceeded, the device will blacklist the associated IP address 152 as described further herein.

The processor 102 is further configured to output the IP address 152 to an indicator management system 180 if the historical contextual information 120 for the IP address 152 exceeds the one or more blocking thresholds 108. The indicator management system 180 is configured to prohibit all potentially hostile access to the network 110 by any IP address 152 output by the processor 102 to the indicator management system 180. The indicator management system 180 maintains a blocklist 182 for a perimeter system 190 of the network 110 and adds the IP address 152 to the blocklist 182. The perimeter system 190 is the full set of individual defensive systems configured to protect network perimeter gateway systems (not shown) representing the outer edges of the network 110 from hostile infrastructure and activity originating outside the network 110. The network perimeter, in some implementations, includes but is not limited to the boundary between the private and locally managed-and-owned side of a network (e.g., a business entity's internal network) and the public and usually provider-managed side of a network (e.g., the public internet). In some implementations, the perimeter system 190 is configured to log the transaction data comprising the application layer data 130.

Such hostile infrastructure and activity includes but is not limited to email screening, firewall penetration, packet sniffing to monitor systems, reverse proxy exploits, or any other vulnerability exploit allows unauthorized access. More generally, the perimeter system is intended to protect against any and all perimeter attacks. Perimeter attacks include but are not limited to any intrusion or other attack intended to exploit a vulnerability on the edge of a network that allows an outside party to gain access to upload a malicious payload. Such perimeter attacks include but are not limited to exploiting an improperly secured port in the gateway system to allow the outside party to upload at least one of a trojan horse, virus, backdoor, shell, or any other similar program giving the outside party command and control or data exfiltration capabilities. The gateway systems are all points of communicative ingress/egress between the network 110 and every other entity outside the network 110 that is communicatively coupled to the network 110.

FIG. 2 and FIG. 3 collectively are tabular diagrams of sample database records of historical contextual information 200, 300 (e.g., the historical contextual information 122 of FIG. 1) for an IP address (e.g., the IP address 152). Each of the database records of historical context information 200, 300 contain at least: a first seen date 212, 312 (e.g., the first seen date 122 of FIG. 1); a last seen date 214; 314 (e.g., the last seen date 124 of FIG. 1); an internal hits count 216, 316 (e.g., the internal hits count 126 of FIG. 1); a prior TCP/IP connection establishment indicator 218, 318 (e.g., the prior TCP/IP connection establishment indicator 128 of FIG. 1); and application data layer information 220, 320 (e.g., the application data layer 130 of FIG. 1). In some implementations, the sample database record of historical contextual information 200 exceeds one or more blocking thresholds (e.g., the one or more blocking thresholds 108 in FIG. 1). In some implementations, the sample database record of historical context information 300 does not exceed one or more blocking thresholds.

FIG. 2 illustrates the sample database record of historical contextual information 200 for an IP address (e.g., the IP address 154) associated with hostile infrastructure. The difference between the first seen date 212 and the last seen date 214 indicate the sample database record of historical contextual information 200 contains data covering a ten-minute period of time. During this time period, the IP address associated with the hostile infrastructure made 5000 attempts to access the network (e.g., the network 110 of FIG. 1) according to the internal hits count 216. The prior TCP/IP connection establishment indicator 218 indicates that no fully authenticated TCP/IP connection has been previously established with this IP address. The application data layer information 220 indicates the IP address is requesting to open a connection on a port associated with an unauthorized remote access protocol (e.g., the protocol associated with the MICROSOFT WINDOWS® Remote Desktop Connection protocol). Thus, malicious electronic activity is automatically identified and associated with a particular IP address in various implementations. That is, thresholding is used to identify the historical data as being malicious and associated with hostile infrastructure.

FIG. 3 illustrates the sample database record of historical contextual information 300 for an IP address associated with regular business infrastructure. The difference between the first seen date 312 and the last seen date 314 indicate the sample database record of historical contextual information 300 contains data covering a two-month period of time. During this time period, the IP address associated with the regular business infrastructure made fifty attempts to access the network (e.g., the network 110 of FIG. 1) according to the internal hits count 316. The prior TCP/IP connection establishment indicator 318 indicates that a fully authenticated TCP/IP connection has been previously established with this IP address. The application data layer information 320 indicates the IP address is requesting to open a connection on a port associated with a trusted Virtual Private Networking (VPN) solution. Thus, regular electronic business activity is automatically identified and associated with a particular IP address in various implementations. That is, thresholding is used to identify the historical data as being legitimate business communication and associated with regular business infrastructure.

It should be noted that these values associated with hostile infrastructure and associated with regular business infrastructure can be different in different applications, settings, business environments, network structures, etc. The values are illustrated merely for example.

Figure 4:
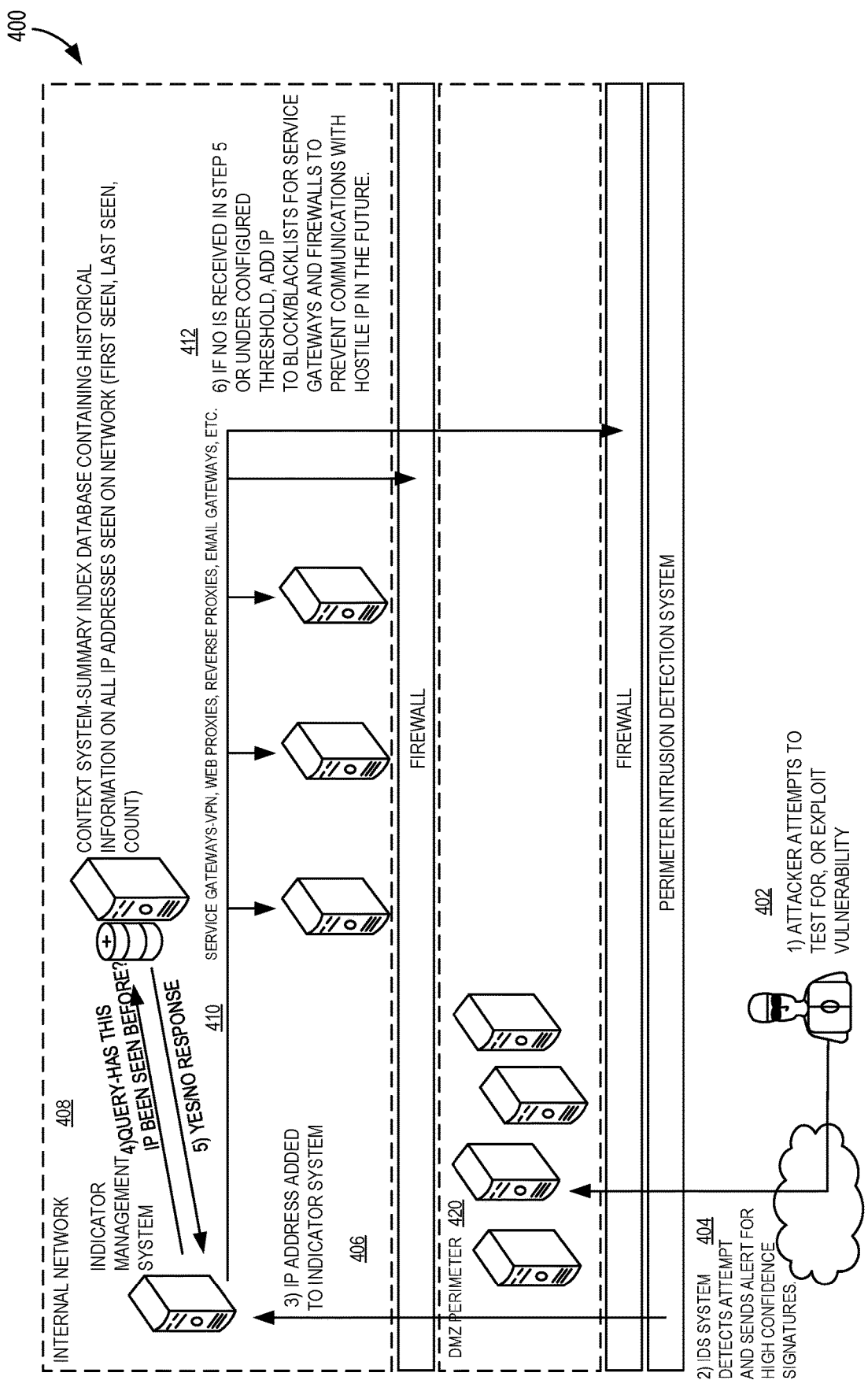
FIG. 4 is a flow diagram illustrating an implementation of automated intrusion alert-based blacklisting on an internal network.

FIG. 4 is a flow diagram illustrating an implementation 400 of automated intrusion alert-based blacklisting on an internal network. During an intrusion attempt 402, an attacker outside a perimeter intrusion detection system (IDS), firewall, and DMZ perimeter 420 (collectively, e.g., the perimeter system 190 of FIG. 1) attempts to test for, or exploit, a vulnerability of a network (e.g., the network 110 of FIG. 1). The IDS detects the intrusion attempt 402 and sends an IDS alert for high confidence signatures at operation 404. The IP address of the attacker is added to an indicator management system (e.g., the indicator management system 180 of FIG. 1) at 406. The indicator management system determines by communication with a context system (e.g., the context system 114 of FIG. 1) whether the IP address has been seen previously on the network at 408, with the indicator management system receiving a yes response or a no response (e.g., true or false response) from the context system at 410. At 412, if the context system transmits a no response to the indicator management system, the IP address is added to a blocklist (e.g., the blocklist 182 of FIG. 1 for service gateways and firewalls, including the perimeter intrusion detection system (IDS), firewall, and DMZ perimeter 420, to prevent communications with the hostile infrastructure of the IP address in the future.

Figure 5:
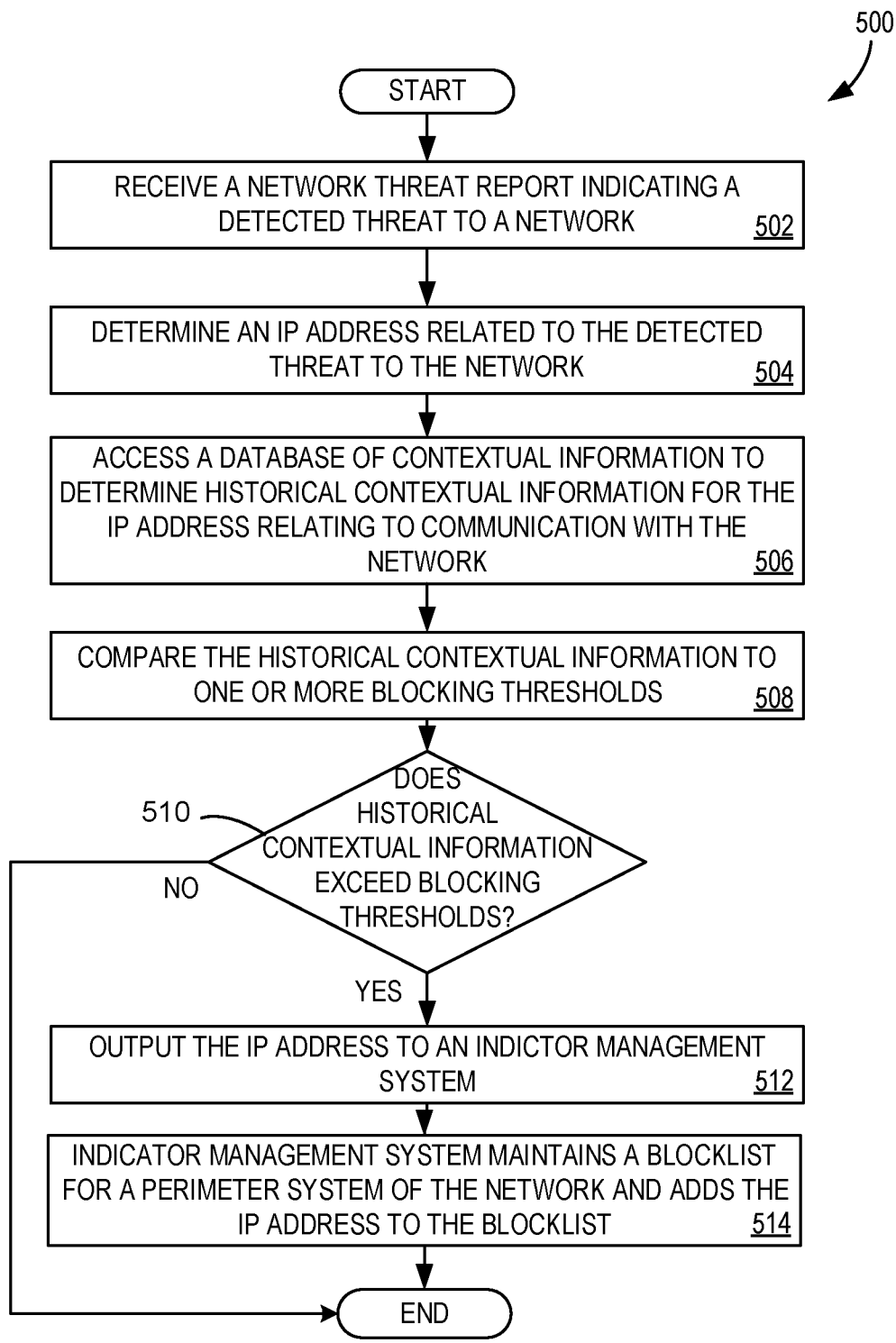
FIG. 5 is flowchart illustrating a method for automated intrusion alert-based blacklisting in accordance with an implementation.

FIG. 5 is a flow chart illustrating a method 500 for automated intrusion alert-based blacklisting. In some implementations, the method shown in FIG. 5 is performed by a device, such as the device 100 in FIG. 1. The method 500 comprises: receiving, using a communication interface, a network threat report indicating a detected threat to a network at 502; determining, using a processor, an Internet Protocol (IP) address related to the detected threat to the network at 504; accessing a database of contextual information to determine historical contextual information for the IP address relating to communication with the network at 506; comparing the historical contextual information to one or more blocking thresholds at 508; and outputting the IP address to an indicator management system if the historical contextual information for the IP address exceeds the one or more blocking thresholds at 510, 512. The indicator management system maintains a blocklist for a perimeter system of the network, and if the IP address is output to the indicator management system at 512, adds the IP address to the blocklist at 514. Thereafter, the process is complete. The operations illustrated in FIG. 5 are performed by a device, aspects of the disclosure contemplate performance of the operations by other entities. In some implementations, a cloud service performs one or more of the operations. Further these steps are performed by one or more implementations described herein.

Figure 6:
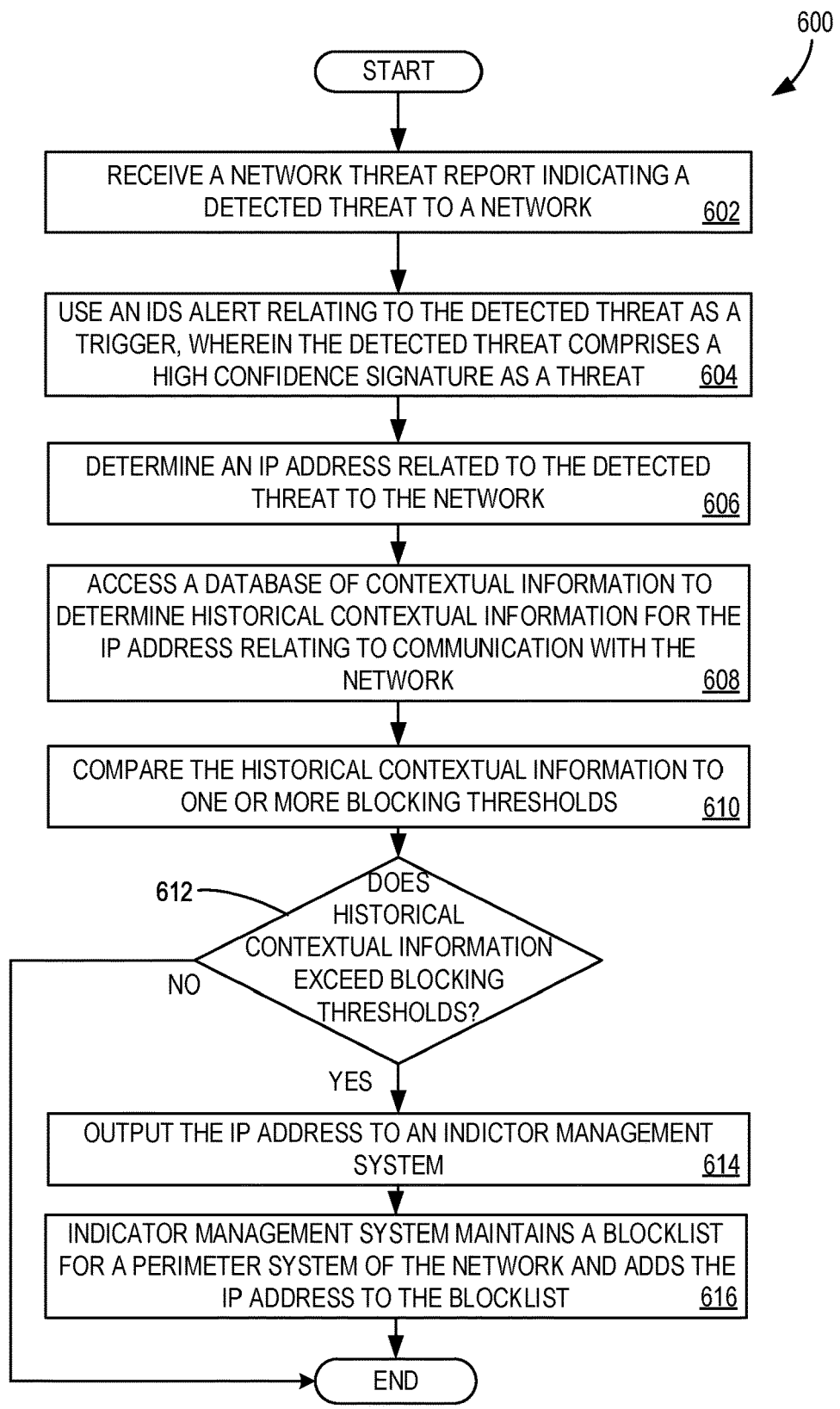
FIG. 6 is a flowchart illustrating a method for automated intrusion alert-based blacklisting using an intrusion detection system (IDS) alert relating to the detected threat, wherein the detected threat comprises a high confidence signature, as a trigger, in accordance with an implementation.

FIG. 6 is a flow chart illustrating a method 600 for automated intrusion alert-based blacklisting using an IDS alert relating to the detected threat, wherein the detected threat comprises a high confidence signature, as a trigger. In some implementations, the method shown in FIG. 6 is performed by a device, such as the device 100 in FIG. 1. Operation 602 is similar to operation 502 of the method 500 depicted in FIG. 5, and accordingly the description will not be repeated. At 604, the processor is further configured to use an intrusion detection system (IDS) alert relating to the detected threat as a trigger, wherein the detected threat comprises a high confidence signature as a threat. In some implementations, the high confidence signature identifies the threat with at least one of no, low, or very low probability of a false positive identification. In some other implementations, the high confidence signature is retrieved from an at least one source. In some such implementations, the at least one source is located on at least one of the device or the network. In other such implementations, the at least one source is a trusted third party. Operations 606, 608, 610, 612, 614, and 616 are similar to operations 504, 506, 508, 510, 512, and 514 of the method 500 depicted in FIG. 5, and accordingly the description will not be repeated. Thereafter, the process is complete. While the operations illustrated in FIG. 6 are performed by a device (e.g., the device 100 of FIG. 1), aspects of the disclosure contemplate performance of the operations by other entities. In some implementations, a cloud service performs one or more of the operations.

Figure 7:
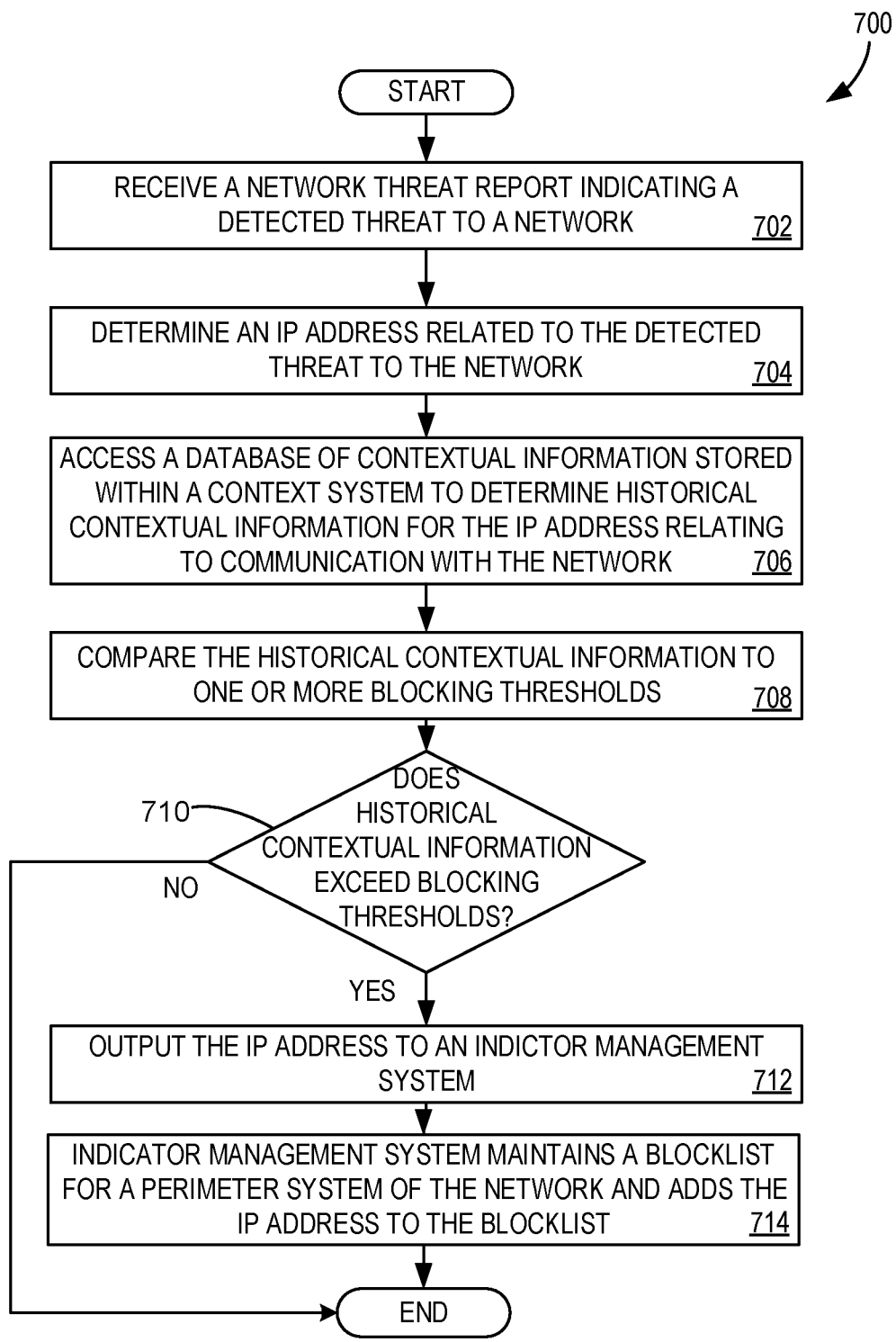
FIG. 7 is flowchart illustrating a method for automated intrusion alert-based blacklisting further comprising use of a context system to determine historical contextual information for an IP address related to communication with a network in accordance with an implementation.

FIG. 7 is a flow chart illustrating a method 700 for automated intrusion alert-based blacklisting further comprising use of a context system to determine historical contextual information for an IP address related to communication with a network. In some implementations, the method shown in FIG. 7 is performed by a device, such as the device 100 in FIG. 1. Operations 702 and 704 are similar to operations 502 and 504 of the method 500 depicted in FIG. 5, and accordingly the descriptions will not be repeated. The historical contextual information is stored in the database of contextual information within a context system, the database of contextual information being a summary database containing historical information for all the IP addresses detected on the network, at 706.

In some implementations, the historical contextual information comprises a first seen date, a last seen date, an internal hits count, and an application layer data for each of the IP addresses. In some such implementations, the historical contextual information comprises a prior TCP/IP connection establishment indicator for each of the IP addresses. The prior TCP/IP connection establishment indicator for each of the IP addresses indicates whether the device has previously established a TCP/IP connection with each IP address. If the device has previously established a TCP/IP connection with each of the IP addresses, the prior TCP/IP connection establishment indicator for each of the IP addresses indicates that each of the IP addresses is valid and not being spoofed. In some implementations, the historical contextual information comprises application layer data. The application layer data comprises, but is not limited to, logged transaction data comprising information on specific recognized types of applications or communications protocols historically associated with an IP address. Thus, in implementations including the application layer data, the application data includes at least one of but is not limited to logged transaction data regarding email history, proxy connection history, webserver connection history, or any other logged transaction data associable with the IP address.

Operations 708, 710, 712, and 714 are similar to operations 508, 510, 512, and 514 of the method 500 depicted in FIG. 5, and accordingly the description will not be repeated. Thereafter, the process is complete. While the operations illustrated in FIG. 7 are performed by a device (e.g., the device 100 of FIG. 1), aspects of the disclosure contemplate performance of the operations by other entities. In some implementations, a cloud service performs one or more of the operations.

In some alternative implementations of the device 100 and the methods 500, 600, and 700, as discussed in detail in the description of FIG. 4 and the implementation 400 herein, during an intrusion attempt (e.g., the intrusion attempt 402 of FIG. 4), the IP address of the attacker (e.g., the IP address 152 of FIG. 1) is added to an indicator management system (e.g., the indicator management system 180 of FIG. 1) immediately after the IP address is determined and before accessing a database of contextual information. Compared to the performance of the device 100 and methods 500, 600, and 700 as discussed herein, such alternative implementations enable recording every intrusion attempt in the indicator management system. This includes intrusion attempts associated with IP addresses whose historical context information does not exceed blocking thresholds and which therefore are not added to the blocklist.

In such alternative implementations of the device 100, the processor 102 is configured to take actions comprising: determining the Internet Protocol (IP) address 152 related to the detected threat 150 to the network 110; outputting the IP address 152 to the indicator management system 180; accessing the database of contextual information 104 to determine historical contextual information 120 for the IP address 152 relating to communication with the network 110; comparing the historical contextual information 120 to the one or more blocking thresholds 108; and if the historical contextual information 120 for the IP address 152 exceeds the one or more blocking thresholds 108, adding the IP address 152 to the blocklist 182 for the perimeter system 190 of the network 110 maintained by the indicator management system 180.

Such alternative implementations of method 500 (not shown) comprise operations occurring in the following order: 502, 504, 512, 506, 508, 510, and 514. Such alternative implementations of method 600 (not shown) comprise operations occurring in the following order: 602, 604, 606, 614, 608, 610, 612, and 616. Such alternative implementations of method 700 (not shown) comprise operations occurring in the following order: 702, 704, 712, 706, 708, 710, and 714. Such alternative implementations of method 500, method 600, and method 700 otherwise operate as previously disclosed herein.

ADDITIONAL EXAMPLES

The disclosure is directed to automated intrusion alert-based blacklisting. Some implementations of automated intrusion alert-based blacklisting include but are not limited to receiving, using a communication interface, a network threat report indicating a detected threat to a network; determining, using a processor, an Internet Protocol (IP) address related to the detected threat to the network; accessing a database of contextual information to determine historical contextual information for the IP address relating to communication with the network; comparing the historical contextual information to one or more blocking thresholds; and outputting the IP address to an indicator management system if the historical contextual information for the IP address exceeds the one or more blocking thresholds. The indicator management system maintains a blocklist for a perimeter system of the network and adds the IP address to the blocklist.

At least a portion of the functionality of the various elements in the figures are in some implementations performed by other elements in the figures, and or an entity (e.g., a computer) not shown in the figures.

In some implementations, the operations illustrated in FIG. 5, FIG. 6, and FIG. 7 are performed by a single person, a group of persons, a fully- or partially-automated device for automated intrusion alert-based blacklisting, or any combination of the foregoing. As an illustration, in some implementations the device for automated intrusion alert-based blacklisting, the indicator management system, and the perimeter system are each be provided by distinct suppliers to a wholly separate assembler who couples the device for automated intrusion alert-based blacklisting, the indicator management system, and the perimeter system together.

As used herein, "infrastructure" or "network infrastructure" includes but is not limited to hardware and software resources of an entire network, enabling network connectivity, communication, operations and management. This infrastructure provides the communication path and services between users, processes, applications, services and external networks. In some implementations, an internal private network and a public network (e.g., the public internet) have separate but communicatively connected infrastructures. When the disclosure herein references "hostile infrastructure," such hostile infrastructure is understood to refer to any infrastructure that is communicatively connected to the network under the protection of the disclosed systems and methods for automated intrusion detection alert-based blacklisting.

As used herein, an Internet Protocol (IP) address (e.g., IP address 152 in FIG. 1) is a numerical label assigned to every device connected to a network using the Internet Protocol to facilitate communication. In the context of the disclosure, IP addresses are readily substitutable for any alternative network addressing protocol (e.g., Media Access Control (MAC) addresses, etc.) that is capable of supporting the full functionality of the disclosure. TCP works in conjunction with the Internet Protocol to provide reliable, ordered, and error-checked delivery of an octet stream (e.g., bytes of data) between applications running on devices communicating via an IP address-mapped network.

UDP utilizes a minimalist connectionless communication model. UDP uses checksums for data integrity, and port numbers for addressing different functions at the source and destination of the datagram. UDP lacks handshaking, exposing traffic to any network unreliability of the underlying network; cannot guarantee delivery or ordering; and cannot provide duplicate protection.

It is noted that a transition is in progress on the public internet between Version 4 of the Internet Protocol (IPv4) and Version 6 of the Internet Protocol (IPv6). IPv4 provides for up to 4,294,967,296 IP addresses for devices on the public internet. IPv6 provides for at least $3.4 \times 10^{38}$ IP addresses on the public internet. Whether the public internet is using IPv4, IPv6, or some combination thereof, the available IP addresses are so numerous that relying primarily on an IDS signature or similar threat indicator to identify and respond to an attack is vastly more efficient and practicable than attempting to build a network security model relying primarily on whitelisting or blacklisting IP addresses. However, as discussed elsewhere herein, using TCP/IP hardware handshake authentication records as a secondary layer of security provides meaningful benefits.

In some implementations, high confidence signatures comprise at least in part information relating to a kill chain model of information security used to model intrusions into a network (e.g., the Lockheed Martin CYBER KILL CHAINED®, the Unified Kill Chain, etc.). In such kill chain models, attacks are understood to occur in progressive phases (ranging, e.g., from early reconnaissance to data exfiltration) such that attacks are terminable via controls established at each phase. The kill chain model, when properly implemented, is a valuable management tool that continuously improves network defense. Various implementations of the kill chain model recognize different phases depending on the needs of a particular application. One hypothetical kill chain model includes but is not limited to the following phases: reconnaissance (e.g., probing for a weakness), weaponization (e.g., building a deliverable payload), delivery (e.g., sending the payload, such as a malicious link), exploit (e.g., executing code at a target's computer), installation (e.g., installing malware on a target asset), C2 (e.g., creating a channel to control a system remotely), and actions (e.g., remotely perform a malicious action).

In some implementations, a detected threat (e.g., the detected threat 150 of FIG. 1) or high confidence signature (e.g., the high confidence signature 154 of FIG. 1) comprises an at least one indicator of compromise (IOC). The at least one IOC comprises an artifact (i.e., an observable feature) that indicates a network threat (e.g., a computer intrusion). In some such implementations, the at least one IOC includes, but is not limited to, an IP address, a virus signature, an e-mail address, an e-mail subject, a domain name, a uniform resource identifier (URI), a uniform resource locator (URL), a filename, a message digest algorithm 5 (MD5) hash, any other type of hash, a file path, or a combination thereof. In some such implementations, the stringency of blocking thresholds (e.g., the blocking thresholds 108 of FIG. 1) is configurable to vary according to the at least one detected IOC. In other such implementations, the IOC is an indicator of a particular phase in the kill chain.

In some implementations, the disclosure, upon detecting a high confidence signature (e.g., via an IDS alert) determines whether or not to block the originating IP address based on context. Specifically, context is provided by determining the number of hits from the originating IP address per unit time. In such implementations, if the number of hits per unit time exceeds an applicable blocking threshold, the IP address is blocked, unless context information associates the IP address with previously or contemporaneously occurring regular business operations.

As disclosed herein, blocking thresholds are configurable to meet the needs or requirements of any particular environment or application. In all implementations of the disclosure utilizing blocking thresholds, the blocking thresholds determine whether traffic from a specific originating IP address should be blocked or blacklisted absent an exception that forbids such blocking or blacklisting. In some implementations, such exceptions include a history of a minimum amount of regular business operations traffic on the network associated with the originating IP address. Such a history of a minimum amount of regular business operations traffic includes, in some implementations, any non-zero amount of regular business operations traffic.

Implementations of the disclosure are usable in any environment or for any application using a network vulnerable to access by hostile infrastructure. Such networks include but are not limited to communications networks used in all types of aerospace applications; terrestrial applications; physical device service or maintenance applications; or any combination thereof.

As an example, an implementation of automated intrusion detection alert-based blacklisting receives the following IDS alert associated with the activity in Table 1:

"alert tcp $EXTERNAL_NET any -> $HOME_NET $HTTP_PORTS (msg:"MALWARE-CNC Win.Backdoor.Chopper web shell connection"; flow:to_server,established; content:"=@eval(get_magic_quotes_gpc( )?stripslashes($_POST["; fast_pattern:only; http_client_body; metadata:impact_flag red, policy balanced-ips drop, policy security-ips drop, ruleset community, service http; reference:url,www.fireeye.com/blog/threat-research/2013/08/breaking-down-the-china-chopper-web-shell-part-ii.html; classtype:trojan-activity; sid:42836; rev:2; gid: 1; )"

TABLE 1

| TIME | PRIORITY | IMPACT | INLINE RESULT | SOURCE IP ADDRESS AND COUNTRY | DESTINATION IP ADDRESS AND COUNTRY |
|---|---|---|---|---|---|
| 2018 Dec. 17 18:46:07 | High | Severe | ⇓ | 185.22.175.238 (RUSSIA) | 130.76.22.21 (USA) |
| 2018 Dec. 17 18:44:36 | High | Severe | ⇓ | 137.175.5.144 (CHINA) | 130.76.184.142 (USA) |
| 2018 Dec. 17 18:43:29 | High | Severe | ⇓ | 185.22.175.238 (RUSSIA) | 130.76.22.20 (USA) |

In the example above, according to the IDS alert and Table 1, the Source IP addresses attempted to load the China Chopper web-shell to the network's perimeter system. The IDS for the China Chopper web-shell is a high fidelity signature, which looks for very specific conditions and for purposes of this hypothetical has a proven history of returning no false positive identifications. A conventional contemporary intrusion detection system, having encountered these attempted intrusions, will block only attacks matching this exact IDS (e.g., the exact character sequence and conditions of the IDS alert). Persistent or sophisticated attackers are able to thwart such limited conventional contemporary approaches merely by changing the type of attack while still using the same source IP address (e.g., a phishing email or command and control operations, instead of an attempt to inject malicious code into a website). The present disclosure as described herein overcomes this limitation of conventional contemporary approaches by blacklisting the hostile infrastructure entirely by identifying the IP address associated with the malicious attack.

Another example involves a scenario where an originating IP address is first encountered seven days previous from the latest connection attempt. A total of thirty-four connection attempts occur. The presence of a high confidence signature in an associated IDS alert verifies that the infrastructure at the originating IP address has attempted an attack. An implementation of the disclosure herein, having verified the attempted attack by IDS alert in the form of a high fidelity signature, and also verified that the applicable blocking thresholds are satisfied (e.g., that blocking the IP address will increase network safety while not impacting regular business operations, based on historical context), outputs the IP address to an indicator management system.

In yet another hypothetical scenario, an IP address owned by a large, reputable provider of online services (e.g., Google) triggers an IDS alert indicating an attack as verified by a high confidence signature. The disclosure herein detects that a blocking threshold is satisfied by the attempted attack. However, the historical context associated with the IP address indicates a history of five billion regular business operations connections originating from the IP address over the past two years. In this hypothetical scenario, an implementation of the disclosure does not output the IP address to an indicator management system because to do so would impermissibly impact regular business operations.

While the aspects of the disclosure have been described in terms of various implementations with their associated operations, a person skilled in the art would appreciate that a combination of operations from any number of different implementations is also within scope of the aspects of the disclosure.

While no personally identifiable information is tracked by aspects of the disclosure, implementations have been described with reference to data monitored and/or collected from the users. In some implementations, notice is provided to the users of the collection of the data (e.g., via a dialog box or preference setting) and users are given the opportunity to give or deny consent for the monitoring and/or collection. The consent sometimes takes the form of opt-in consent or opt-out consent.

Exemplary Operating Environment

The present disclosure is operable in a variety of environments for a variety of applications. For illustrative purposes only, and with no intent to limit the possible operating environments in which implementations of the disclosure operate, the following exemplary operating environment is presented.

Figure 8:
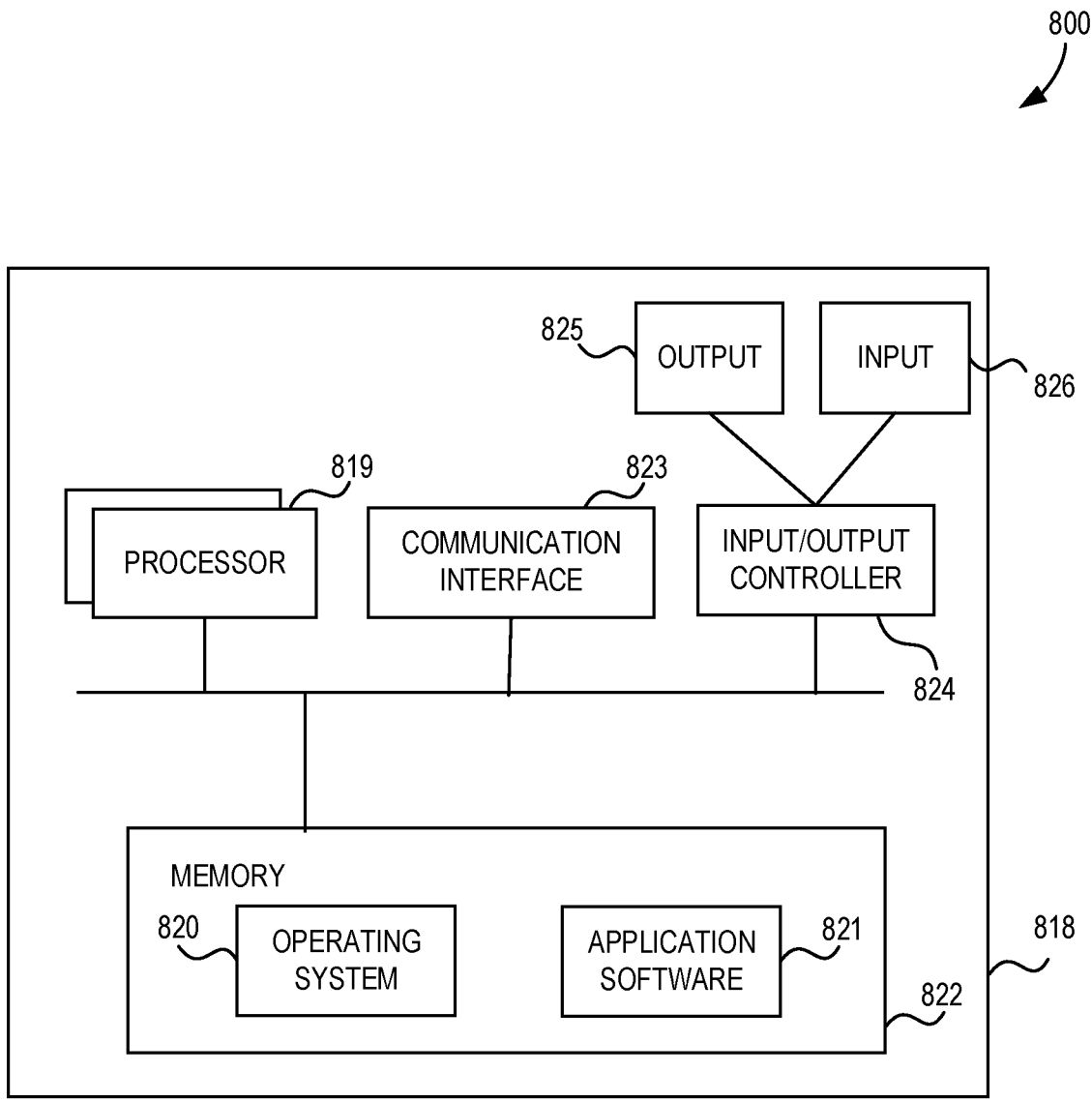
FIG. 8 is an exemplary block diagram illustrating an operating environment in accordance with an implementation.

The present disclosure is operable with a computing apparatus according to an implementation as a functional block diagram 800 in FIG. 8. In such an implementation, components of a computing apparatus 818 may be implemented as a part of an electronic device according to one or more implementations described in this specification. The computing apparatus 818 comprises one or more processors 819 which may be microprocessors, controllers or any other suitable type of processors for processing computer executable instructions to control the operation of the electronic device. Platform software comprising an operating system 820 or any other suitable platform software may be provided on the apparatus 818 to enable application software 821 to be executed on the device. According to an implementation, automated intrusion detection alert-based blacklisting as described herein may be accomplished by software.

Computer executable instructions may be provided using any computer-readable media that are accessible by the computing apparatus 818. Computer-readable media may include, without limitation, computer storage media such as a memory 822 and communications media. Computer storage media, such as a memory 822, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that is usable to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, in some implementations a display or a speaker, which may be separate from or integral to the electronic device. The input/output controller 824 may also be configured to receive and process an input from one or more input devices 826, in some implementations a keyboard, a microphone or a touchpad. In one implementation, the output device 825 may also act as the input device. A touch sensitive display is one such device. The input/output controller 824 may also output data to devices other than the output device, e.g., a locally connected printing device. In some implementations, a user may provide input to the input device(s) 826 and/or receive output from the output device(s) 825.

The functionality described herein is performable, at least in part, by one or more hardware logic components. According to an implementation, the computing apparatus 818 is configured by the program code when executed by the processor 819 to execute the implementations of the operations and functionality described. Alternatively, or in addition, the functionality described herein is performable, at least in part, by one or more hardware logic components. Without limitation, illustrative types of hardware logic components that are usable include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Thus, various implementations include a systems and methods for receiving, using a communication interface, a network threat report indicating a detected threat to a network; determining, using a processor, an IP address related to the detected threat to the network; accessing a database of contextual information to determine historical contextual information for the IP address relating to communication with the network; comparing the historical contextual information to one or more blocking thresholds; and outputting the IP address to an indicator management system if the historical contextual information for the IP address exceeds the one or more blocking thresholds. The indicator management system maintains a blocklist for a perimeter system of the network and adds the IP address to the blocklist.

As described herein, the present disclosure provide systems and methods for automated intrusion alert-based blacklisting. The systems and methods herein efficiently and effectively construct and deploy within an automated intrusion alert-based blacklist suitable for use in a number of network environments, including but not limited to the above exemplary operating environment.

While various spatial and directional terms, such as top, bottom, lower, mid, lateral, horizontal, vertical, front and the like may be used to describe the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein is extendable or alterable without losing the effect sought, as will be apparent to the skilled person. Any time period or range of time given herein may cover other time periods or ranges of time.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above can relate to one implementation or can relate to several implementations. The implementations are not limited to those that address every issue discussed in the Background herein or those that have any or all of the stated benefits and advantages.

The implementations illustrated and described herein as well as implementations not specifically described herein but within the scope of aspects of the claims constitute exemplary means for automated intrusion alert-based blacklisting.

The order of execution or performance of the operations in implementations of the disclosure illustrated and described herein is not essential, unless otherwise specified. That is, the operations may be performed in any order, unless otherwise specified, and examples of the disclosure may include additional or fewer operations than those disclosed herein. As an illustration, it is contemplated that executing or performing a particular operation before, contemporaneously with, or after another operation is within the scope of aspects of the disclosure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Clauses

The following clauses describe further aspects:

Clause Set A:

A1. A device for automated intrusion alert-based blacklisting comprising:
    a communication interface configured to receive a network threat report indicating a detected threat to a network; and
    a processor configured to:
    determine an Internet Protocol (IP) address related to the detected threat to the network;
    access a database of contextual information to determine historical contextual information for the IP address relating to communication with the network;
    compare the historical contextual information to one or more blocking thresholds; and
    output the IP address to an indicator management system if the historical contextual information for the IP address exceeds the one or more blocking thresholds;
    whereby the indicator management system maintains a blocklist for a perimeter system of the network and adds the IP address to the blocklist.

A2. The device of any preceding clause, wherein the processor is further configured to use an intrusion detection system (IDS) alert relating to the detected threat as a trigger, wherein the detected threat comprises a high confidence signature as a threat.

A3. The device of any preceding clause, wherein the high confidence signature identifies the threat with at least one of no, low, or very low probability of a false positive identification.

A4. The device of any preceding clause, wherein the high confidence signature is retrieved from an at least one source.

A5. The device of any preceding clause, wherein the at least one source is located on at least one of the device or the network.

A6. The device of any preceding clause, wherein the at least one source is a trusted third party.

A7. The device of any preceding clause, wherein the historical contextual information is stored in the database of contextual information within a context system, the database of contextual information being a summary database containing historical information for all the IP addresses detected on the network.

A8. The device of any preceding clause, wherein the historical contextual information comprises a first seen date, a last seen date, an internal hits count, and an application layer data for each of the IP addresses.

A9. The device of any preceding clause, wherein the historical contextual information comprises a prior TCP/IP connection establishment indicator for each of the IP addresses;

such that the prior TCP/IP connection establishment indicator for each of the IP addresses indicates whether the device has previously established a TCP/IP connection with each IP address;

whereby the device having previously established a TCP/IP connection with each of the IP addresses indicates that each of the IP addresses is valid and not being spoofed.

Clause Set B:

B1. A method for automated intrusion alert-based blacklisting comprising:

receiving, using a communication interface, a network threat report indicating a detected threat to a network;

determining, using a processor, an Internet Protocol (IP) address related to the detected threat to the network;

accessing a database of contextual information to determine historical contextual information for the IP address relating to communication with the network;

comparing the historical contextual information to one or more blocking thresholds; and outputting the IP address to an indicator management system if the historical contextual information for the IP address exceeds the one or more blocking thresholds;

whereby the indicator management system maintains a blocklist for a perimeter system of the network and adds the IP address to the blocklist.

B2. The method of any preceding clause, wherein the processor is further configured to use an intrusion detection system (IDS) alert relating to the detected threat as a trigger, wherein the detected threat comprises a high confidence signature as a threat.

B3. The method of any preceding clause, wherein the high confidence signature identifies the threat with at least one of no, low, or very low probability of a false positive identification.

B4. The method of any preceding clause, wherein the high confidence signature is retrieved from an at least one source.

B5. The method of any preceding clause, wherein the at least one source is located on at least one of the device or the network.

B6. The method of any preceding clause, wherein the at least one source is a trusted third party.

B7. The method of any preceding clause, wherein the historical contextual information is stored in the database of contextual information within a context system, the database of contextual information being a summary database containing historical information for all the IP addresses detected on the network.

B8. The method of any preceding clause, wherein the historical contextual information comprises a first seen date, a last seen date, an internal hits count, and application layer data for each of the IP addresses.

B9. The method of any preceding clause, wherein the historical contextual information comprises a prior TCP/IP connection establishment indicator for each of the IP addresses;

such that the prior TCP/IP connection establishment indicator for each of the IP addresses indicates whether the device has previously established a TCP/IP connection with each IP address;

whereby the device having previously established a TCP/IP connection with each of the IP addresses indicates that each of the IP addresses is valid and not being spoofed.

Clause Set C:

C1. One or more non-transitory computer readable media having computer-executable instructions stored thereon for automated intrusion alert-based blacklisting, which, on execution by a computer, cause the computer to perform operations comprising:

receiving, using a communication interface, a network threat report indicating a detected threat to a network;

determining, using a processor, an Internet Protocol (IP) address related to the detected threat to the network;

accessing a database of contextual information to determine historical contextual information for the IP address relating to communication with the network;

comparing the historical contextual information to one or more blocking thresholds; and outputting the IP address to an indicator management system if the historical contextual information for the IP address exceeds the one or more blocking thresholds;

whereby the indicator management system maintains a blocklist for a perimeter system of the network and adds the IP address to the blocklist.

C2. The one or more non-transitory computer readable media of any preceding clause, wherein the processor is further configured to use an intrusion detection system (IDS) alert relating to the detected threat as a trigger, wherein the detected threat comprises a high confidence signature as a threat.

What is claimed is:

1. A device for automated intrusion alert-based blacklisting comprising:

a communication interface configured to receive a network threat report indicating a detected threat to a network; and a processor configured to:

determine an Internet Protocol (IP) address related to the detected threat to the network;

access a database of contextual information to determine historical contextual information for the IP address relating to communication with the network;

compare the historical contextual information to one or more blocking thresholds;

based at least on the comparing, determine that the device has previously established a TCP/IP connection with the IP address;

based at least on determining that the device has previously established a TCP/IP connection with the IP address, indicate the IP address is a valid IP address and is not spoofed; and output the valid IP address to an indicator management system if the historical contextual information for the IP address exceeds the one or more blocking thresholds;

whereby the indicator management system maintains a blocklist for a perimeter system of the network and adds the IP address to the blocklist.

2. The device of claim 1, wherein the processor is further configured to use an intrusion detection system (IDS) alert relating to the detected threat as a trigger, wherein the detected threat comprises a high confidence signature as a threat.

3. The device of claim 2, wherein the high confidence signature identifies the threat with at least one of no, low, or very low probability of a false positive identification.

4. The device of claim 2, wherein the high confidence signature is retrieved from an at least one source.

5. The device of claim 4, wherein the at least one source is located on at least one of the device or the network.

6. The device of claim 4, wherein the at least one source is a trusted third party.

7. The device of claim 1, wherein the historical contextual information is stored in the database of contextual information within a context system, the database of contextual information being a summary database containing historical information for all the IP addresses detected on the network.

8. The device of claim 7, wherein the historical contextual information comprises a first seen date, a last seen date, an internal hits count, and application layer data for each of the IP addresses.

9. The device of claim 7, wherein the historical contextual information comprises a prior TCP/IP connection establishment indicator for each of the IP addresses;
such that the prior TCP/IP connection establishment indicator for each of the IP addresses indicates whether the device has previously established a TCP/IP connection with each IP address;
whereby the device having previously established a TCP/IP connection with each of the IP addresses indicates that each of the IP addresses is valid and not being spoofed.

10. The device of claim 1, wherein determining that the device has previously established a TCP/IP connection with the IP address further comprises:
determining that the IP address is used to conduct regular business operations on the network; and
leaving undisturbed the regular business operations associated with the IP address.

11. The device of claim 10, further comprising:
preventing an attacker, the attacker having originated the detected threat, from blocking access from at least the network to a piece of infrastructure outside the network, the piece of infrastructure being associated with the regular business operations.

12. A method for automated intrusion alert-based blacklisting comprising:
receiving, using a communication interface, a network threat report indicating a detected threat to a network;
determining, using a processor, an Internet Protocol (IP) address related to the detected threat to the network;
accessing a database of contextual information to determine historical contextual information for the IP address relating to communication with the network;
comparing the historical contextual information to one or more blocking thresholds;
based at least on the comparing, determine that the device has previously established a TCP/IP connection with the IP address;
based at least on determining that the device has previously established a TCP/IP connection with the IP address, indicating the IP address is a valid IP address and is not spoofed; and
outputting the valid IP address to an indicator management system if the historical contextual information for the IP address exceeds the one or more blocking thresholds;
whereby the indicator management system maintains a blocklist for a perimeter system of the network and adds the IP address to the blocklist.

13. The method of claim 12, further comprising using an intrusion detection system (IDS) alert relating to the detected threat as a trigger, wherein the detected threat comprises a high confidence signature as a threat, wherein the high confidence signature identifies the threat with at least one of no, low, or very low probability of a false positive identification.

14. The method of claim 13, wherein the high confidence signature is retrieved from an at least one source; and wherein the at least one source is at least one of:
located on at least one of a device or the network, or
is a trusted third party.

15. The method of claim 12, wherein the detected threat originates from a hostile infrastructure and comprises at least one of a reconnaissance stage scan or attack phase, the reconnaissance stage scan comprising attempts by the hostile infrastructure to scan for vulnerabilities, and the attack phase comprising a unique attack condition used to penetrate or compromise the network.

16. The method of claim 12, wherein the historical contextual information is stored in the database of contextual information within a context system, the database of contextual information being a summary database containing historical information for all the IP addresses detected on the network.

17. The method of claim 16, wherein the historical contextual information comprises a first seen date, a last seen date, an internal hits count, and an application layer data for each of the IP addresses.

18. The method of claim 16, wherein the historical contextual information comprises a prior TCP/IP connection establishment indicator for each of the IP addresses;
such that the prior TCP/IP connection establishment indicator for each of the IP addresses indicates whether the processor has previously established a TCP/IP connection with each IP address;
whereby the processor having previously established a TCP/IP connection with each of the IP addresses indicates that each of the IP addresses is valid and not being spoofed.

19. One or more non-transitory computer readable media having computer-executable instructions stored thereon for automated intrusion alert-based blacklisting, which, on execution by a computer, cause the computer to perform operations comprising:
receiving, using a communication interface, a network threat report indicating a detected threat to a network;
determining, using a processor, an Internet Protocol (IP) address related to the detected threat to the network;
accessing a database of contextual information to determine historical contextual information for the IP address relating to communication with the network;
comparing the historical contextual information to one or more blocking thresholds;
based at least on the comparing, determine that the device has previously established a TCP/IP connection with the IP address;
based at least on determining that the device has previously established a TCP/IP connection with the IP address, indicating the IP address is a valid IP address and is not spoofed; and
outputting the valid IP address to an indicator management system if the historical contextual information for the IP address exceeds the one or more blocking thresholds;

whereby the indicator management system maintains a blocklist for a perimeter system of the network and adds the IP address to the blocklist.

20. The one or more non-transitory computer readable media of claim 19, wherein the processor is further configured to use an intrusion detection system (IDS) alert relating to the detected threat as a trigger, wherein the detected threat comprises a high confidence signature as a threat.

\* \* \* \* \*